United States Patent [19]
Watanabe et al.

[11] Patent Number: 6,006,992
[45] Date of Patent: *Dec. 28, 1999

[54] BAR CODE READER, BAR CODE READING METHOD AND COMPUTER READABLE MEDIUM

[75] Inventors: Mitsuo Watanabe; Isao Iwaguchi; Shinichi Sato; Hiroaki Kawai; Motohiko Itoh, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/045,899

[22] Filed: Mar. 23, 1998

[30] Foreign Application Priority Data

Aug. 19, 1997 [JP] Japan ..................................... 9-222425

[51] Int. Cl.⁶ .................................................... G06K 7/10
[52] U.S. Cl. ................. 235/462.12; 235/472.01
[58] Field of Search ........................... 235/462.12, 472.01

[56] References Cited

U.S. PATENT DOCUMENTS 5,689,103  11/1997  Watanabe et al. ................. 235/462.12

*Primary Examiner*—Harold I. Pitts
*Attorney, Agent, or Firm*—Armstrong, Westerman, Hattori, McLeland & Naughton

[57] ABSTRACT

A CPU deals, as valid data, with demodulated data obtained by synthesizing demodulated data obtained by reading a first data block of an upper stage with demodulated data obtained by reading a second data block of the upper stage, and demodulated data obtained by synthesizing demodulated data obtained by reading a first data block of a lower stage with demodulated data obtained by reading a second data block of the lower stage, as far as both of the demodulated data obtained by reading the first data block of the upper stage of two column codes structured by arranging WPC codes up and down at two columns and the demodulated data obtained by reading the first data block of the lower stage, contain a portion corresponding to data characters of the second data block, and as far as these sets of demodulated data are different from each other.

8 Claims, 11 Drawing Sheets

FIG. 11

| NUMERICAL DATA | NUMBER OF MODULES | | | | | | NUMERICAL DATA | NUMBER OF MODULES | | | | | |
|---|---|---|---|---|---|---|---|---|---|---|---|---|---|
| | a | b | c | d | T1 | T2 | | a | b | c | d | T1 | T2 |
| O-0 | 3 | 2 | 1 | 1 | 3 | 2 | E-0 | 1 | 1 | 2 | 3 | 3 | 5 |
| O-1 | 2 | 2 | 2 | 1 | 4 | 3 | E-1 | 1 | 2 | 2 | 2 | 4 | 4 |
| O-2 | 2 | 1 | 2 | 2 | 3 | 4 | E-2 | 2 | 2 | 1 | 2 | 3 | 3 |
| O-3 | 1 | 4 | 1 | 1 | 5 | 2 | E-3 | 1 | 1 | 4 | 1 | 5 | 5 |
| O-4 | 1 | 1 | 3 | 2 | 4 | 5 | E-4 | 2 | 3 | 1 | 1 | 4 | 2 |
| O-5 | 1 | 2 | 3 | 1 | 5 | 4 | E-5 | 1 | 3 | 2 | 1 | 5 | 3 |
| O-6 | 1 | 1 | 1 | 4 | 2 | 5 | E-6 | 4 | 1 | 1 | 1 | 2 | 2 |
| O-7 | 1 | 3 | 1 | 2 | 4 | 3 | E-7 | 2 | 1 | 3 | 1 | 4 | 4 |
| O-8 | 1 | 2 | 1 | 3 | 3 | 4 | E-8 | 3 | 1 | 2 | 1 | 3 | 3 |
| O-9 | 3 | 1 | 1 | 2 | 2 | 3 | E-9 | 2 | 1 | 1 | 3 | 2 | 4 |

FIG. 12
| FLAG CHARACTER | DATA CHARACTER COMBINATION OF LEFT BLOCK | | | | | |
|---|---|---|---|---|---|---|
| | C1 | C2 | C3 | C4 | C5 | C6 |
| 0 | O | O | O | O | O | O |
| 1 | O | O | E | O | E | E |
| 2 | O | O | E | E | O | E |
| 3 | O | O | E | E | E | O |
| 4 | O | E | O | O | E | E |
| 5 | O | E | E | O | O | E |
| 6 | O | E | E | E | O | O |
| 7 | O | E | O | E | O | E |
| 8 | O | E | O | E | E | O |
| 9 | O | E | E | O | E | O |
FIG. 13
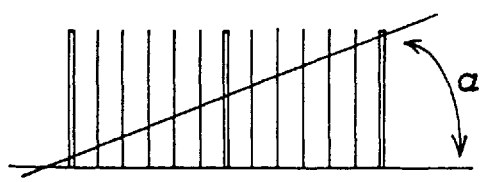
FIG. 14
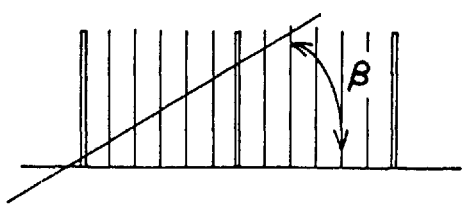

BAR CODE READER, BAR CODE READING METHOD AND COMPUTER READABLE MEDIUM

BACKGROUND OF THE INVENTION

1. Field of the Invention

The present invention relates to a bar code reader and a bar code reading method suitable for reading two column bar codes structured by arranging bar codes at two columns, and to a computer readable medium for storing a program for such a reading process.

2. Description of the Related Art

In recent years, it has been generalized that commercial goods are managed by bar codes as typified by a POS system in the sector of distribution industries etc. For example, in the POS system in a shop, pieces of information on classifications and sales prices etc of the goods are coded in a format of the bar code and printed on the goods. The bar code is read at the check-out counter, and a payment is made based on the thus read information. Then, the number of sold goods is counted in real time, and a result of count serves for an inventory management and a stocking management.

The above bar code is roughly classified into a WPC code such as a JAN code, a UPC code and an EAN code, and into a variable length second code. Among these codes, the WPC code has a start guard bar (SGB) added to a left end thereof, a center bar (CB) inserted in a middle portion thereof and an end guard bar (EGB) added to the right end thereof. A left (first) data block consisting of six or four data characters is provided between the start guard bar and the center bar, and a right (second) data block consisting of six or four data characters is provided between the center bar and the end guard bar.

Pattern of these guard bar and the center bar are predetermined by the specification, and therefore a bar code reader is capable of detecting these guard bars and center bar.

Further, the bar code reader is capable of reading the data character (a coded numerical values or symbolic minimum unit) of the bar code on the basis of the guard bars and the center bar. There are three reading methods, i.e., a continuous reading method, a block reading method and a division reading method. The continuous reading method is such that when detecting the two guard bars and the center bar by one bar code scanning process, the data characters interposed between the two guard bars are demodulated as a bar code. Further, the block reading method is that the block of the data characters is recognized as a bar code though the block is interposed by one guard and the center bar, and, after separately demodulating the two blocks, demodulated data of these respective blocks are synthesized (integrated), thereby reproducing the data modulated into the single bar code. Moreover, according to the division reading method, even a data character string contiguous to the single guard bar or the center bar at the minimum is recognized as a bar code, and fragments of the demodulated data of those data characters that have been separately read are synthesized, thereby reproducing the demodulated data corresponding to the whole single bar code. Namely, the block reading method and the division reading methods are implemented in such a case that the whole bar code ranging from the start guard bar to the end guard bar can not be read by one scanning process.

Incidentally, the WPC code has its own limit in terms of a quantity of expressible information because of being a fixed length code. Hence, for the purpose of increasing the quantity of expressible information while keeping the code system of the WPC code, there has hitherto been implemented a method in which the WPC codes are arranged at two columns (stages) and treated as one set of bar codes, and one piece of information is expressed by the bar codes arranged at the two columns (hereinafter referred to as a "two column bar code"). FIG. 15 shows an outline of structure of the above two column bar code. As can be understood from FIG. 15, the two column bar code is constructed of four blocks (A–D).

In this case, recognition flags indicating the upper stage and the lower stage is set in a left data block (A, C), and hence the bar code reader is capable of recognizing whether the block is the upper or lower stage block. No such recognition flag is, however, set in a right data block (B, D), and therefore the bar code reader is incapable of distinguishing between the upper block and the lower block from only the demodulated data corresponding to the right block. Accordingly, if the demodulated data obtained by the block reading method described above are treated also as valid data, there might be a possibility in which the bar code reader mis-recognizes the data in such a case that the bar code of the upper stage is constructed of demodulated data (1) obtained by reading the left data block (A) of the upper stage and demodulated data (4) obtained by reading the right data block (D) of the lower stage. Similarly, there might be the possibility in which the bar code reader mis-recognizes the data in such a case that the bar code of the lower stage is constructed of demodulated data (3) obtained by reading the left data block (C) of the lower stage and demodulated data (2) obtained by reading the right data block (B) of the upper stage. Namely, two combinations of right and left data blocks of the upper and lower stages are possible in the whole two column bar code, however, the bar code reader is incapable of identifying one correct combination among those combinations. Then, if a modulus 10 check with respect to the bar code of each of the upper and lower stages becomes OK by accident, the bar code reader might fall into a misjudgment that the demodulation has been completed in spite of the fact that the demodulated data corresponding to the two column bar code are not reproduced.

Therefore, the prior art bar code reader deals, as valid data, with the demodulated data ((5), (6)) obtained by the continuous reading method, and reproduces the demodulated data corresponding to the whole two column bar code on the basis of only the demodulated data obtained by continuously reading the bar code of the upper stage and the bar code of the lower stage, respectively.

The individual bar codes constituting the two column bar code take a truncate label with a small height in the vertical direction, and therefore a probability that a scan beam travels through each bar code non-stop from one end to the other end, is extremely low. Accordingly, it takes a long time till the demodulated data based on the continuous reading method are obtained, and eventually it takes a long time to reproduce the demodulated data corresponding to the whole two column bar code.

SUMMARY OF THE INVENTION

It is a primary object of the present invention to provide a bar code reader capable of accurately synthesizing demodulated data obtained by block-reading a second data block with demodulated data obtained by block-reading a left data block per stage of a two column bar code and therefore capable of reproducing demodulated data corresponding to the whole two column bar code for a short time.

To accomplish the above object, according to a first aspect of the present invention, a bar code reader comprises a bar code pattern detecting unit scanning a two column bar code consisting of a first bar code and a second bar code, each of said bar code containing a left data block and a second data block, each of said data block containing a predetermined number of data characters, and detecting a bar code pattern on a trajectory of the scanning, a demodulating unit obtaining demodulated data by demodulating the bar code pattern detected by said bar code pattern detecting unit, a first buffer storing the demodulated data when the demodulated data obtained by said demodulating unit contain a portion corresponding to of the left data block of the first bar code, a second buffer storing the demodulated data when the demodulated data obtained by said demodulating unit contain a portion corresponding to the left data block of the second bar code, a third buffer storing the demodulated data when the demodulated data obtained by said demodulating unit contain a portion corresponding to the second data block of the first bar code or the second bar code, a first synthesizing unit synthesizing the demodulated data stored in said first buffer with the demodulated data stored in said third buffer, a second synthesizing unit synthesizing the demodulated data stored in said second buffer with the demodulated data stored in said third buffer, and a validating unit, only when both of the demodulated data stored in said first buffer and the demodulated data stored in said second buffer contain a portion corresponding to data characters of the second data block and portions corresponding to the data characters of the second data blocks of the both of demodulated data are different from each other, the demodulated data synthesized by said first synthesizing unit as demodulated data corresponding to the first bar code and validating the demodulated data synthesized by said second synthesizing unit as demodulated data corresponding to the second bar code.

With this construction, the bar code pattern detecting unit detects the bar code pattern on the trajectory by scanning the two column bar code. Then, the demodulating unit demodulates the bar code patterns sequentially detected by the bar code pattern detecting unit, and outputs the demodulated data. This set of demodulated data is stored in the first buffer and stored in the second buffer when containing the portion corresponding to the left data block of the second bar code when containing the portion corresponding to the left data block of the first bar code. The demodulated data are stored in the third buffer when containing the portion corresponding to the second data block of any one of the columns. Then, the first synthesizing unit synthesizes the demodulated data stored in the first buffer with the demodulated data stored in the third buffer. The second synthesizing unit synthesizes the demodulated data stored in the second buffer with the demodulated data stored in the third buffer. The validating unit validates the demodulated data synthesized by the first synthesizing unit as demodulated data corresponding to the first bar code, and validates the demodulated data synthesized by the second synthesizing unit as demodulated data corresponding to the second bar code, only when both of the demodulated data stored in the first buffer and the demodulated data stored in the second buffer contain the portion corresponding to the data characters of the second data block, and the portions corresponding to the data characters of the second data blocks in the respective sets of demodulated data are different from each other. Accordingly, if the demodulated data stored in the first buffer or the demodulated data stored in the second buffer do not contain the portion corresponding to the data characters of the second data block, and if the portions corresponding to the data characters of the second data blocks contained in the respective sets of demodulated data are identical with each other, there might be a possibility in which the demodulated data corresponding to the bar code can not be precisely synthesized, and hence the validating unit does not execute the above validation. The possibility of misreading when effecting the division reading process of the two column bar code is obviated.

In the bar code reader according to a second aspect of the present invention, the bar code is a WPC code, a UPC/A code, a JAN code or an EAN code.

In the bar code reader according to a third aspect of the present invention, the first synthesizing unit synthesizes, only when the demodulated data stored in the first buffer and the demodulated data stored in the third buffer overlap each other by two or more characters, these pieces of demodulated data. The second synthesizing unit synthesizes, only when the demodulated data stored in the second buffer and the demodulated data stored in the third buffer overlapped with each other by two or more characters, these pieces of demodulated data.

3. A bar code reader according to claim 1, wherein said first synthesizing unit synthesizes, only when the demodulated data stored in said first buffer and the demodulated data stored in said third buffer are overlapped with each other by two or more characters, these pieces of demodulated data, and said second synthesizing unit synthesizes, only when the demodulated data stored in said second buffer and the demodulated data stored in said third buffer are overlap each other by two or more characters, these pieces of demodulated data.

In the bar code reader according to a fourth aspect of the present invention, the validating unit, only when both of the demodulated data stored in said first buffer and the demodulated data stored in said second buffer contain a portion corresponding to two or more data characters of the second data block, validates the demodulated data obtained by said first synthesizing unit as demodulated data corresponding to the first bar code, and validates the demodulated data obtained by said second synthesizing unit as demodulated data corresponding to the second bar code. With this construction, it is ensured that the demodulated data to be synthesized overlap each other by two or more characters in the second data block, whereby the possibility of causing a mistake in synthesizing the demodulated data can be further reduced.

In the bar code reader according to a fifth aspect of the present invention, the validating unit, when the demodulated data stored in said first buffer correspond to the first bar code and the demodulated data stored in said second buffer correspond to the second bar code, validates the demodulated data stored in said first buffer as demodulated data corresponding to the first bar code, and validates the demodulated data stored in said second buffer as demodulated data corresponding to the second bar code With this construction, when the demodulated data based on the continuous reading process are obtained, the demodulated data are immediately validated, and consequently a response of reading the bar code is further enhanced.

A bar code reading method according to the present invention comprises a step of scanning a two column bar code containing a first bar code and a second bar code, each of said bar code containing a left data block and a second data block, each of said data block containing a predetermined number of data characters, and detecting a bar code pattern on a trajectory of the scanning; a step of obtaining demodulated data by demodulating the bar code pattern; a step of generating demodulated data corresponding to the first bar code by synthesizing demodulated data containing a portion corresponding to the left data block of the first bar code with demodulated data containing a portion corresponding to the right data block of the first bar code or the second bar code; a step of generating demodulated data corresponding to the second bar code by synthesizing demodulated data containing a portion corresponding to the left data block of the second bar code with demodulated data containing a portion corresponding to the second data block of the first bar code or the second bar code; and a step of validating the demodulated data corresponding to the first bar code and validating the demodulated data corresponding to the second bar code only when both of the demodulated data containing the portion corresponding to the left data block of the first bar code and the demodulated data containing the portion corresponding to the left data block of the second bar code contain a portion corresponding to data characters of the second data block and portions corresponding to the data characters of the second data blocks of both of demodulated data are different from each other.

A computer readable medium according to the present invention is stored with a program for enabling a computer connected to a detecting device for scanning a two column bar code containing a first bar code and a second bar code, each of said bar code containing a left data block and a second data block, each of said data block containing a predetermined number of data characters, and detecting a bar code pattern on a trajectory of the scanning, to execute: a step of obtaining demodulated data by demodulating the bar code pattern detected by said detecting device; a step of generating demodulated data corresponding to the first bar code by synthesizing demodulated data containing a portion corresponding to the left data block of the first bar code with demodulated data containing a portion corresponding to the second data block of the first bar code or the second bar code; a step of generating demodulated data corresponding to the second bar code by synthesizing demodulated data containing a portion corresponding to the left data block of the second bar code with demodulated data containing a portion corresponding to the second data block of the first bar code or the second bar code; and a step of validating the demodulated data corresponding to the first bar code and validating the demodulated data corresponding to the second bar code only when both of the demodulated data containing the portion corresponding to the left data block of the first bar code and the demodulated data containing the portion corresponding to all of the left data block of the second bar code contain a portion corresponding to data characters of the second data block and portions corresponding to the data characters of the second data blocks of both of demodulated data are different from each other.

BRIEF DESCRIPTION OF THE DRAWINGS

The invention will be described below in detail with reference to the accompanying drawings, in which:

FIG. 11 is a table showing a correspondence between numerical data and bar combinations to be respective characters;

FIG. 12 is a table showing a correspondence between combinations of odd- and even-numbered parities and flag characters in a left data block;

FIG. 13 is a view showing an angle of a scan beam at which a continuous reading process can be done;

FIG. 14 is a view showing an angle of the scan beam at which a block reading process can be done.

DESCRIPTION OF THE PREFERRED EMBODIMENT

Figure 9:
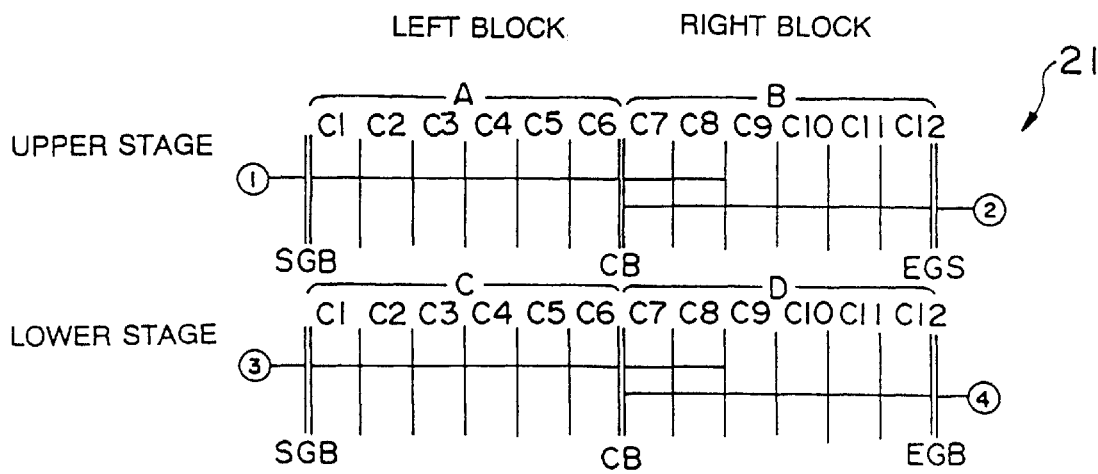
FIG. 9 is a diagram showing a structure of a two column bar code.

An embodiment of the present invention will hereinafter be described with reference to the accompanying drawings.
Structure of Two-Stage Bar Code To start with, a structure of a two-stage bar code to be read by a bar code reader in the embodiment of the present invention, will be explained with reference to FIG. 9. As illustrated in FIG. 9, the two-stage bar code are structured such that two bar codes (WPC codes) are arranged up and down in parallel. Then, the bar code (the WPC code) of each stage includes a start guard bar (SGB) consisting of a bar with a fixed pattern at a right end thereof, a center bar (CB) consisting of a bar similarly formed with a fixed pattern, and an end guard bar (EGB) consisting of a bar similarly formed with a fixed pattern. Then, the WPC code has a left data block composed of six pieces of data characters (C1–C6) between the start guard bar (SGB) and the center bar (CB), and a right data block composed of six pieces of data characters (C7–C12) between the center bar (CB) and the end guard bar (EGB).

Figure 10:
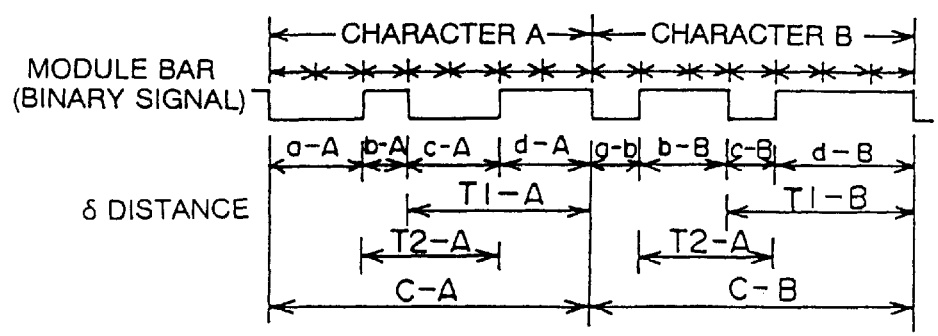
FIG. 10 is a diagram showing a structure of characters of a WPC code.
Figure 15:
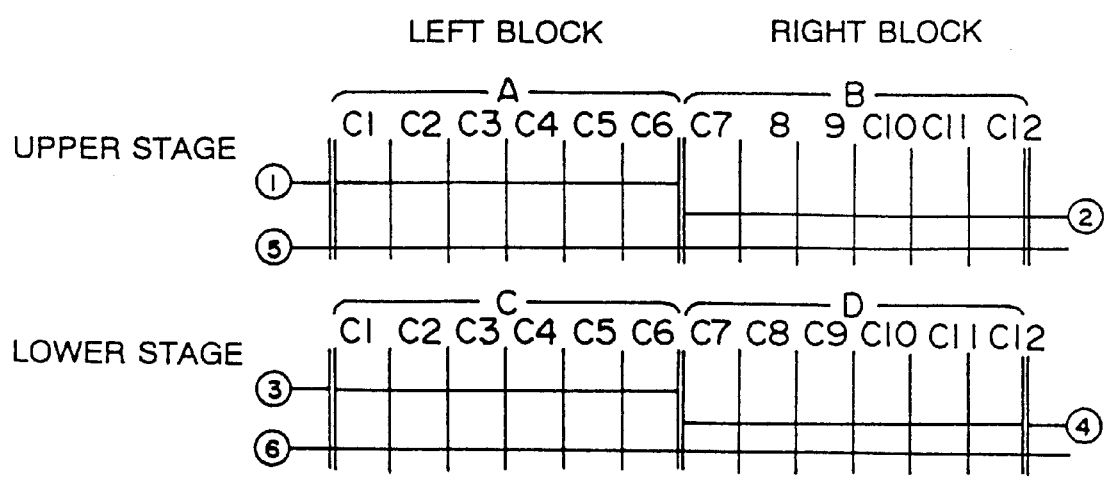
FIG. 15 is an explanatory diagram showing how a two column bar code is read in the prior art.

Each of the data characters (C1–C12) is, as illustrated in FIG. 10, a combination of two white bars and two black bars that are formed by respectively properly allocating seven modules (each module has a unit length) to white or black. Then, in the respective data characters (C1–C6) structuring the left data block, four bars constituting each data character are arranged in a white/black/white/black sequence from the start guard bar (SGB). In the respective data characters (C7–C12) structuring the right data block, the four bars are arranged in a black/white/black/white sequence from the center bar (CB).

FIG. 11 is a table showing all combinations of lengths (the number of modules) which can be taken by the respective bars (a, b, c, d) of the data character as well as showing numerical data corresponding the respective combinations. Note that "E–" in the numerical data represents a character of an even-numbered parity, and "O–" designates a character of an odd-numbered parity. Further, T2 indicates a length obtained by adding the last bar (d) of each character to the bar (c) just anterior thereto, and T2 indicates a length obtained by adding the bar (c) to the bar (b) just anterior thereto. Both of these lengths are called a "δ distance".

According to a rule of the WPC CODE, the right data block consists of only the even-number parity data characters, and the left data block consists of the even- and odd-numbered parity data characters. The combinations of the even- and odd-numbered parities that can be taken by the six data characters of the left data block are, however, limited to ten ways shown in FIG. 12 according to the rule of the WPC code. Then, unique numerical values (0 through 9), i.e., flag characters are respectively defined with respect to the combinations. The WPC code (UPC/A code, JAN-13 code, and EAN code) consisting of twelve data characters is known as a "13-digit bar code" in a case where the flag character is also contained in the number of digits. Note that the flag characters are used for identifications of the upper and lower stages in the two-stage bar code. Namely, a combination of the flag character and the first character is called a "recognition flag". If this "recognition flag" is a specified numerical value (e.g., "21), this indicates the upper stage bar code. If the "recognition flag" is other specified numerical value (e.g., "29"), this indicates the lower stage bar code. Incidentally, as shown in FIG. 12, the combinations of the even- and odd-numbered parities that can be taken by the six data characters of the left data block have, as compared with all other combinations, two or more differences in the even- or odd-numbered parity.

Further, according to the rule of the WPC code, if the twelve data characters contained in the 13-digit bar code are classified into an odd- or even-numbered position in sequence, wherein the rightmost character is defined as the odd-numbered position (the flag character is classified into the odd-numbered position), a sum of a triple of a total sum of the numerical values of the data characters in the odd-numbered positions and a total sum of the numerical values of the data characters in the even-numbered positions, becomes an integer multiple of 10. If this rule is utilized, it is feasible to easily confirm whether or not demodulated data corresponding to the whole bar code are reproduced. This confirmation is called a "modulus 10 check".

Figure 1:
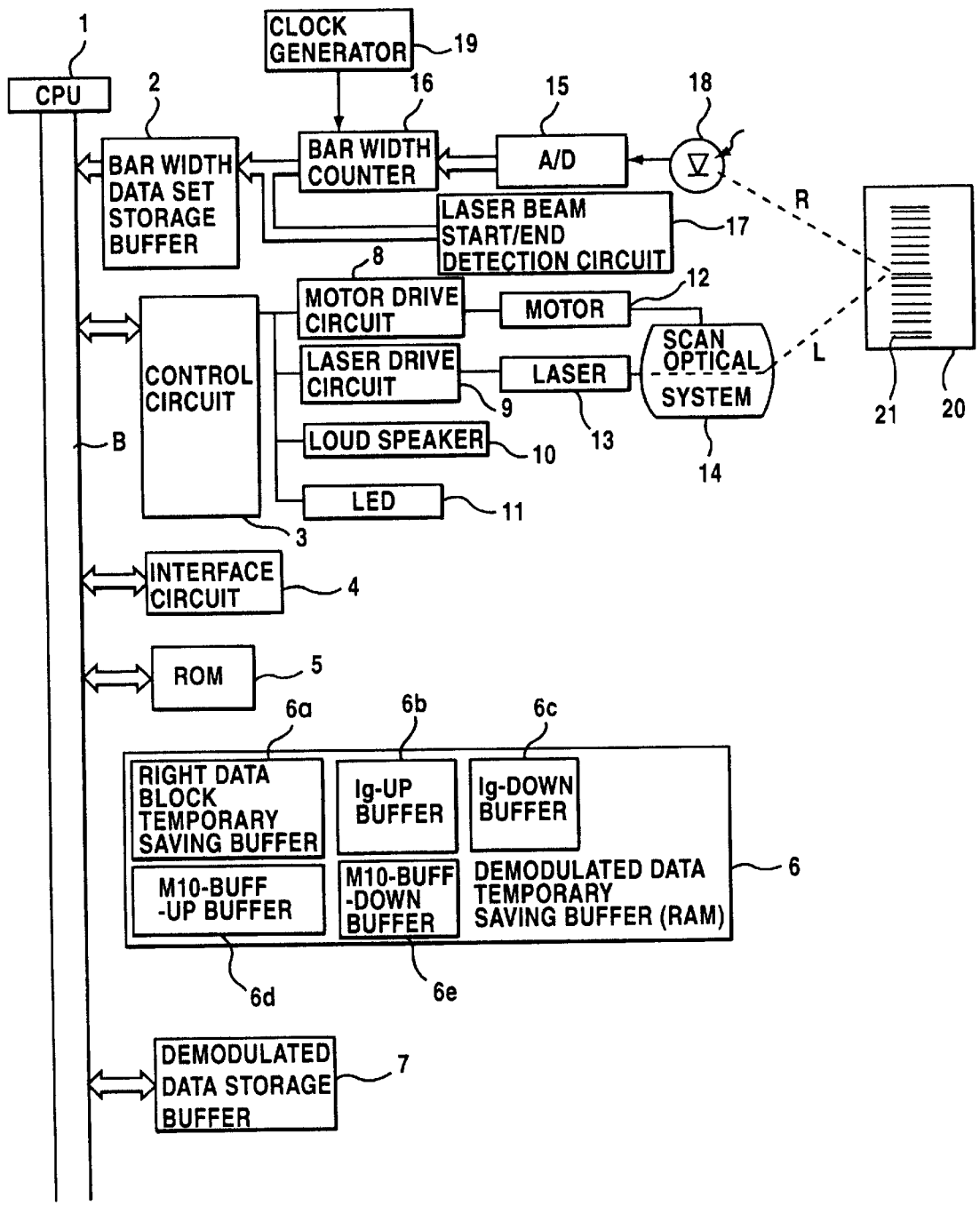
FIG. 1 is a block diagram showing a bar code reader in one embodiment of the present invention.

Referring to FIG. 1, the bar code reader is provided with a CPU 1, a bar width data set storage buffer 2, a control circuit 3, an interface circuit 4, a ROM 5, a demodulated data temporary saving buffer 6 and a demodulated data storage buffer 7 which are connected via a bus one anther, a bar width counter 16 and a laser beam start/end detection circuit 17 connected to the bar width data set storage buffer 2, a clock 19 and an A/D converter 15 connected to the bar width counter 16, a light receiving element 18 connected to the A/D converter 15, a motor drive circuit 8, a laser drive circuit 9, a speaker 10 and a LED connected to the control circuit 3, a motor connected to the motor drive circuit 8, a scan optical system 14 driven by the motor 12, and a semiconductor laser 13 connected to the laser drive circuit 9.

The ROM 5 is a read-only memory storing a bar code recognizing/demodulating process program as a computer readable medium.

A CPU 1 defined as a computer executes a bar code recognition/demodulation processing program stored in a ROM 5, thereby controlling the whole bar code reader. The CPU 1 also functions as a demodulating unit, a first synthesizing unit, a second synthesizing unit and a validating unit, and reproduces the data corresponding to whole two-stage bar codes 21 by each set of bar width data obtained by reading the bar code of each stage of the two-stage bar codes 21.

Developed in the demodulated temporary saving buffer 6 which is a RAM are an operation area of the CPU 1, and a right data block temporary saving buffers 6a, an Ig-up buffer 6b, an Ig-down buffer 6c, an M10-buff-up buffer 6d and an M10-buff-down buffer 6e by the CPU 1 executing the above bar code recognition/demodulation processing program.

The interface circuit 4 controls a status of a bus B and controls a data transmission to an outside device.

The control circuit 3 controls the motor drive circuit 8, the laser drive circuit 9, the speaker 10 and the light emitting diode (LED) 11. The motor drive circuit 8 drives the motor 12 to rotate a polygon mirror (which is not shown) constituting the scan optical system 14. Further, the laser drive circuit 9 drives a semiconductor laser 13 to emit laser beams L. Further, the speaker 10 emits a voice indicating a completion of reading (demodulating) the bar code. The light emitting diode 11 is a display element for displaying data such as a sales price of the goods 20, which are obtained as a result of the demodulation of the bar code.

The laser beams L emitted from the semiconductor laser 13 are made incident to the scam optical system 14 and deflected by this scan optical system 14. More specifically, the scan optical system 14 deflects the laser beams L in one direction by use of the polygon mirror (not shown) rotated by the motor 12. A plurality of fixed mirrors are fixed on the side opposite to the polygon mirror. Accordingly, the laser beams L deflected by the polygon mirror are re-reflected in various direction by the respective fixed mirrors. As a result, the deflecting direction (which is the scan direction) of the laser beams L is changed to a variety of directions. The scan optical system 14 performs consecutive laser-beam scans in the plurality of directions at a high speed within a period of the deflection by one reflection surface of the polygon mirror. Each of the plurality of laser-beam scans performed within the period of the deflection by one reflection surface of the polygon mirror is hereinafter referred to as "one scan".

When the thus scanning laser beams L strike on the surface (containing a two-column bar code 21) of the goods 20, the laser beams L are irregularly reflected from the surface, and some of reflected beams R are received by the light receiving element (which is the photo diode) 18. The light receiving element 18 outputs electric currents corresponding to brightness and darkness of the reflected light beams R received. The A/D converter 15 compares the electric current outputted by the light receiving element 18 with a predetermined threshold value and converts the current into a binary signal. This binary signal indicates "H" level when an intensity of the reflected beams R corresponds to a reflectivity of the black bar in the two-stage bar code 21 and "L" level when the intensity of the reflected beams R corresponds to a reflectivity of the white bar in the two-stage bar code 21.

A bar width counter 16 measures a period from a rise timing of the binary signal to a fall timing thereof (which is expected to correspond to a width of the black bar in the two-stage bar code 21). The bar width counter 16 also measures a period from the fall timing of the binary signal to the rise timing thereof (which is expected to correspond to a width of the white bar in the two-column bar code 21). Note that the bar width counter 16 counts the number of clocks inputted from a clock 19 for measuring the time corresponding to each of those bar widths. Read data of the respective bar s that are outputted from the bar width counter 16 take such a form that the count value and a color distinguishing signal indicating the white or the black are combined. The bar width counter 16 consecutively outputs the read data each time the laser-beam is scanned. A series of the read data that are thus consecutively outputted during each one scan are called as "bar width data set".

The above-described control unit circuit 3, the motor driving circuit 8, the motor 12, the laser driving circuit 9, the semiconductor laser 13, the scan optical system 14, the light receiving element 18, the A/D converter 15, the bar width counter 16 and the clock 19 correspond to a bar code pattern detecting unit for detecting a bar code pattern on a scan trajectory by scanning the two-stage bar codes 21 consisting of the two-stage WPC codes.

The bar width data set outputted from the bar width counter 16 is inputted to a laser beam start/end detection circuit 17. This laser beam start/end detection circuit 17 checks a status of the bar width data set and detects a start timing and an end timing of one scan of laser beams. The laser beam start/end detection circuit 17 then adds to the bar width data set pieces of data indicating the start timing and the end timing.

The bar width data set storage buffer 2 temporarily stores the bar width data set to which the data indicating the start timing and end timing of the laser beams are added. The bar width data set storage buffer 2 sequentially stores the bar width data set inputted from the bar width counter 16 and transfers the bar width data set piece by piece in the sequence in which the data set has been stored in response to a request from the CPU 1.

Figure 2:
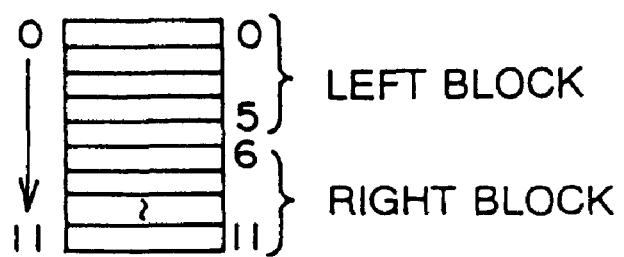
FIG. 2 is a diagram showing a construction of an Ig-up buffer and an Ig-down buffer in FIG. 1.
Figure 3:
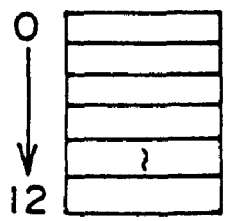
FIG. 3 is a diagram showing a construction of an M10-buff-up buffer and an M10-buff-down buffer in FIG. 1.

The right data block temporary saving buffer 6a, the Ig-up buffer 7b and the Ig-down buffer 6c are classified as buffers for temporarily storing demodulated data obtained as a result of executing a demodulating process on the bar width data set. More specifically, the right data block temporary saving buffer 6a is a temporary saving buffer (corresponding to a third buffer) for the demodulated data corresponding to the right data block. Further, the Ig-up buffer 6b is a temporary saving buffer (corresponding to a first buffer) for the demodulated data containing the region corresponding to the left data block of the upper-stage bar code (the first stage WPC code). As shown in FIG. 2, the Ig-up buffer 6b has twelve entries with addresses 0 through 11, and stores the entries 0–5 with the data corresponding to the left data block and the entries 6–11 with the data corresponding to the right data block. Similarly, the Ig-down buffer 6c is a temporary saving buffer (corresponding to a second buffer) for the demodulated data containing the region corresponding to the left data block of the lower-stage bar code (the second stage WPC code), and has a structure shown in FIG. 2. Further, the M10-buff-up buffer 6d stores the demodulated data (containing the flag character at its head) corresponding to the whole upper stage bar code in which a result of the above-mentioned modulus 10 check becomes OK, and, as illustrated in FIG. 3, thirteen entries with the addresses 0–12. Similarly, the M10-buff-down buffer 6e stores the demodulated data (containing the flag character at its head) corresponding to the whole lower stage bar code in which the result of the above-mentioned modulus 10 check becomes OK, and has a structure shown in FIG. 3.

Bar Code Recognizing/Demodulating Process

Next, a specific content of a bar code recognition/demodulation processing program stored in the ROM 5 and executed by the CPU 1, will be explained with reference to flowcharts in FIGS. 4 through 8.

Figure 4:
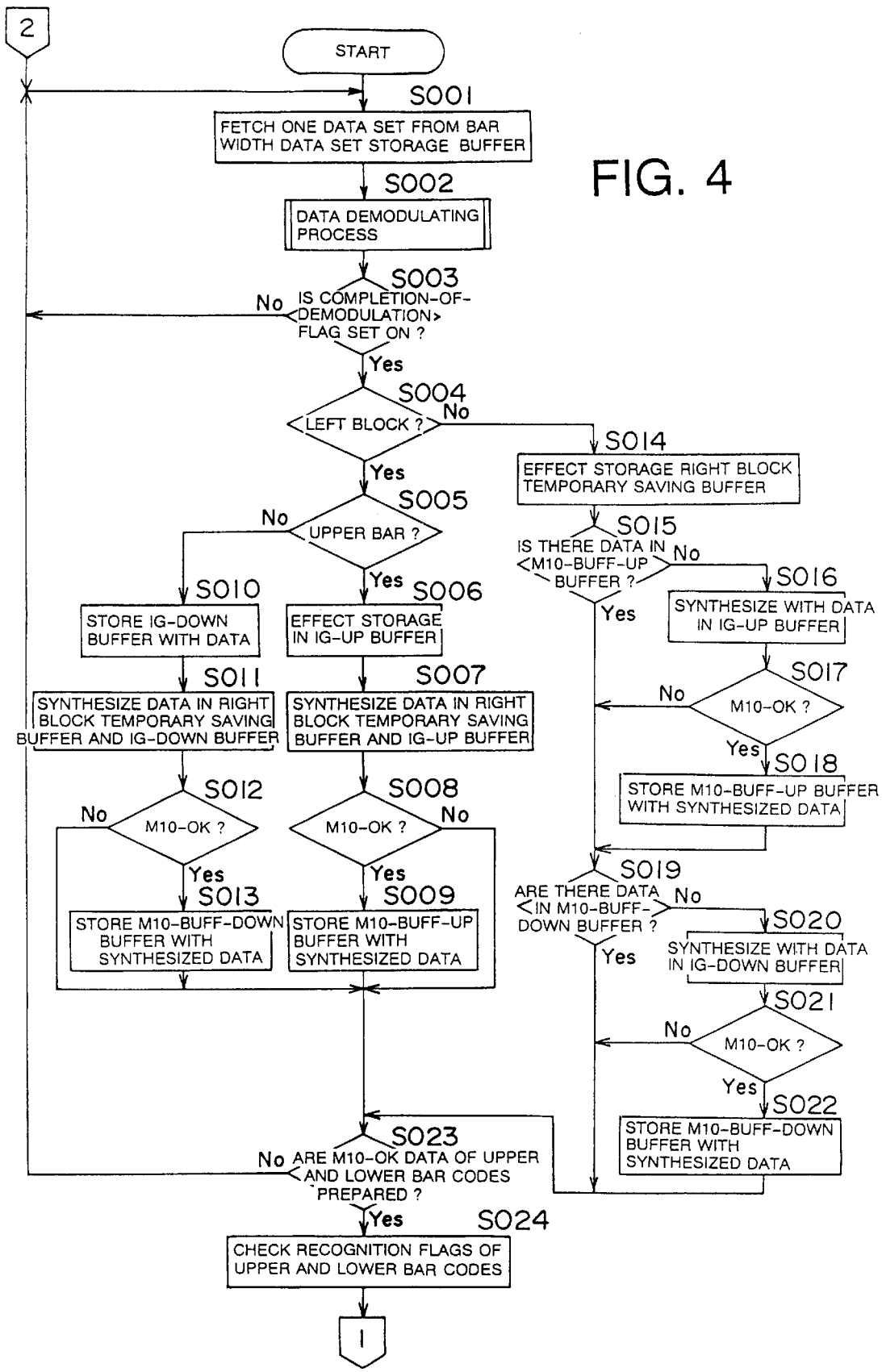
FIG. 4 is a flowchart showing contents of a bar code recognition/demodulation processing program executed by a CPU in FIG. 1.
Figure 5:
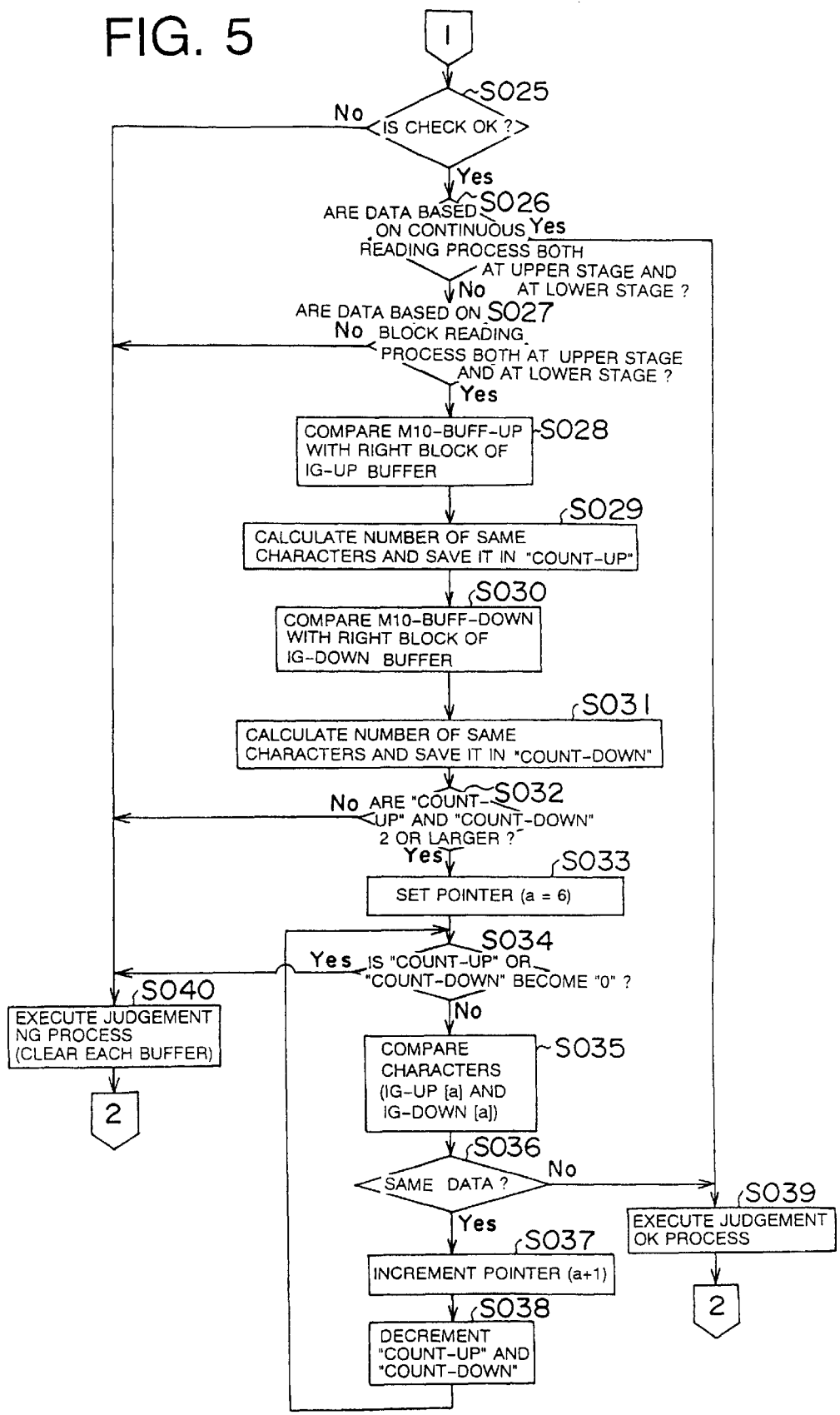
FIG. 5 is a flowchart showing contents of the bar code recognition/demodulation processing program executed by the CPU in FIG. 1.

The flowcharts in FIGS. 4 and 5, which are defined as a main routine of the bar code recognizing/demodulating process, start upon switching ON a main power supply of the bar code reader and storing the bar width data set storage buffer 2 with the bar width data sets. Then, in first step S001, the CPU 1 fetches one the oldest bar width data set out of the bar width data set storage buffer 2.

Figure 6:
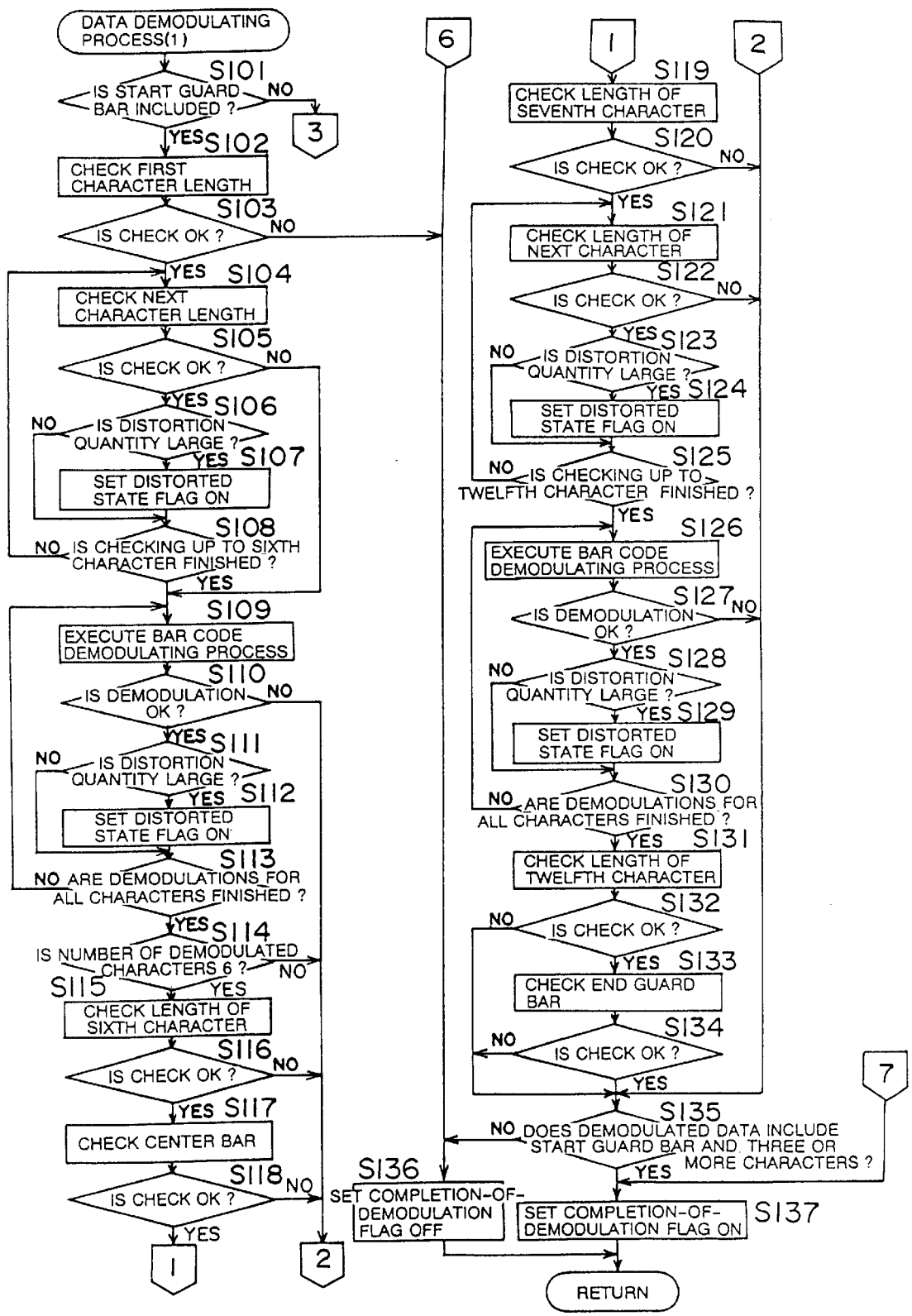
FIG. 6 is a flowchart showing contents of a data demodulating process executed by in step S002 in FIG. 4.
Figure 7:
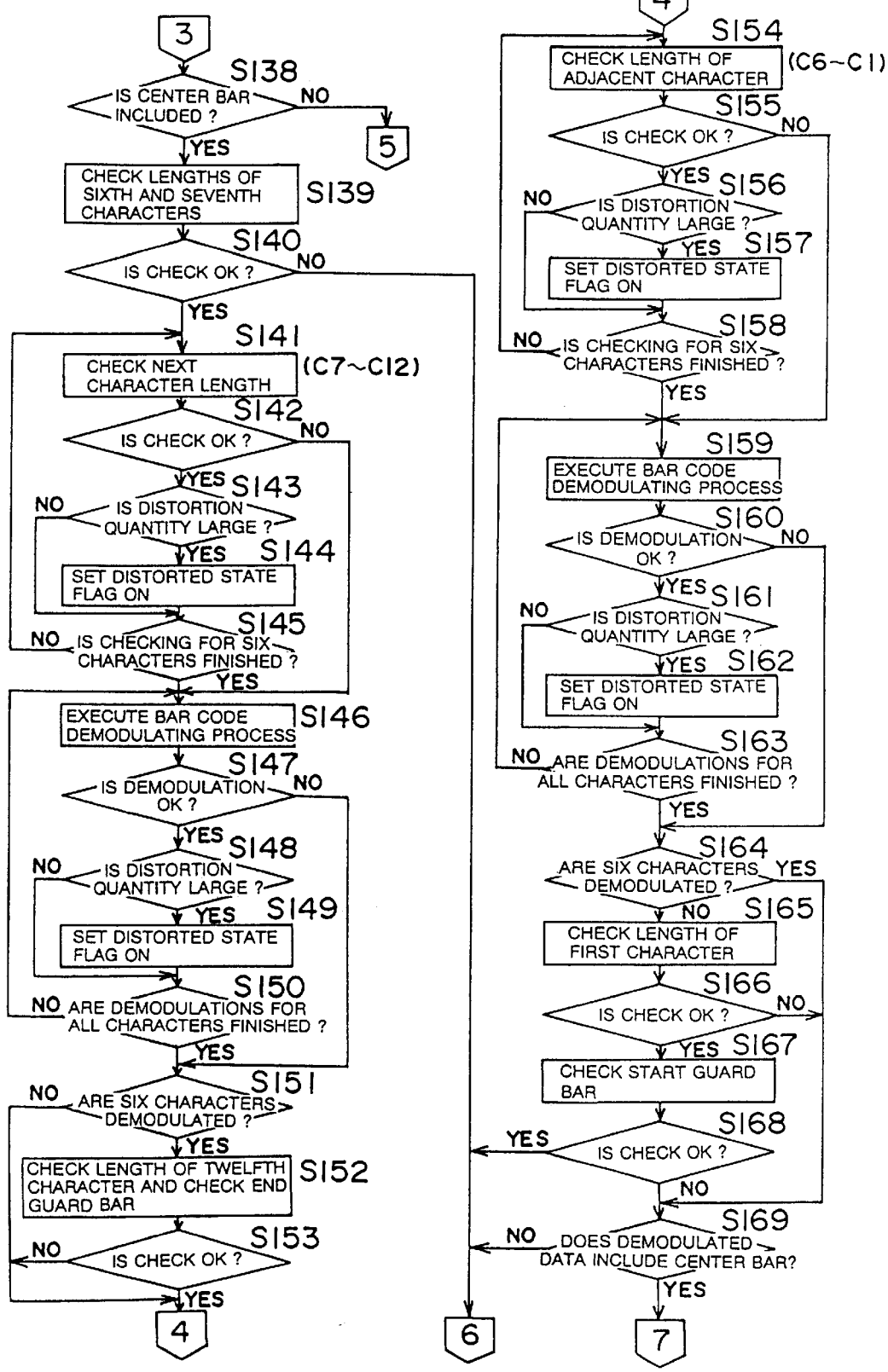
FIG. 7 is a flowchart showing contents of the data demodulating process executed in step S002 in FIG. 4.
Figure 8:
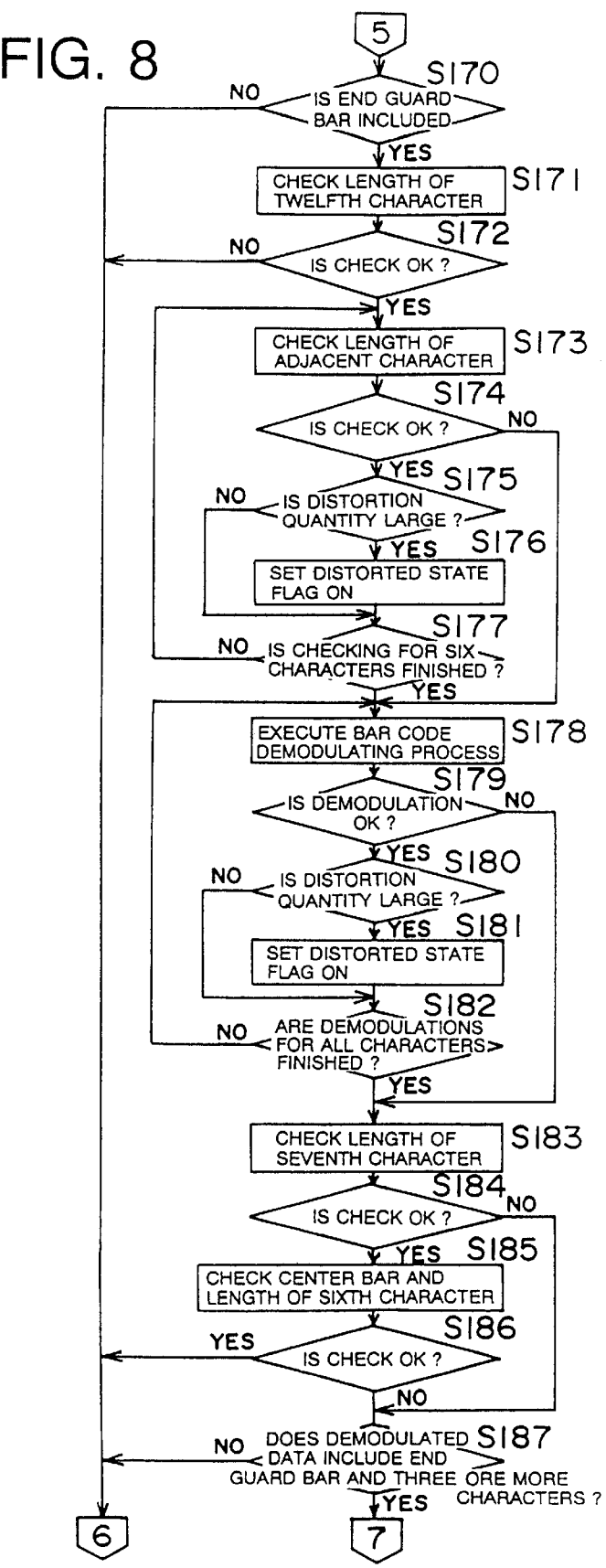
FIG. 8 is a flowchart showing contents of the data demodulating process executed in step S002 in FIG. 4.

In step S002, the CPU 1 executes a data demodulating process for the bar width data set fetched in step S001 (which corresponds to a demodulating unit). FIGS. 6 through 8 is a flowchart showing a data demodulating process subroutine executed in step S001. In first step S101 in this subroutine, the CPU 1 checks whether the bar width data set to be processed includes a start guard bar or not. When the bar width data set to be processed includes a start guard bar, the CPU 1 advances the process to the step S102. Processes in steps S102 through S135 are processes for demodulating characters from the start guard bar to a limit capable being modulated.

In step S102, the CPU 1 checks a length of a first character (next to the start bar on the side toward the center bar). More specifically, the CPU 1 checked whether a total sum of bar width count values of four bars forming the first character is in the vicinity of a fixed value or not. Then, if the length of the first character is not in the vicinity of the fixed value (S103), the CPU 1 conceives the data set as a data set based on a pattern other than the bar code, resets a "completion-of-demodulation flag" in step S136, and terminates this subroutine. Contrastingly, if the length of the first character is in the vicinity of the fixed value (S103), the CPU 1 advances the processing to step S104.

In step S104, the CPU 1 checked a length of the next character (which is defined as second character next to the first character in the initial status). Then, if the length of this character is not in the vicinity of the fixed value (S105), the CPU 1 advances the processing to step S109 to demodulate the characters in the first block of which length has hitherto been determined to be in the vicinity of the fixed value. Contrastingly, if the length of the same character is in the vicinity of the fixed value (S105), the CPU 1 checked whether a distortion quantity of the character is large or not in step S106. Subsequently, if the distortion quantity of the character is small, the CPU 1 advances the processing directly to step S108. If any one of the distortion quantities of the character is large (i.e., if a ratio between items of bar width data corresponding to the respective characters exceeds a fixed range, or if a ratio between items of bar width data corresponding to the respective modules exceeds a fixed range), the CPU 1 advances the processing to step S108 after setting a "distorted state flag" in step S107. In step S108, the CPU 1 checks whether the checking processes of the lengths of the characters are finished up to the sixth character (adjacent to the center bar on the side toward the start bar). Then, when the checks of the lengths of the characters are finished up to the sixth character, the CPU 1 advances the processing to step S109 to demodulate the six characters constituting the first block. Whereas, if the checks of the lengths of characters are not yet finished up to the sixth character, the CPU 1 returns the processing to step S104 to check a length of the next character adjacent thereto.

In step S109, the CPU 1 fetches the character closest to the start guard bar among the characters of which lengths are determined to be in the vicinity of the fixed value in steps S103 and S105, and executes the demodulating process for the fetched character.

In next step S110, the CPU 1 checks whether the demodulating process in step S109 succeeds or not. Then, if the demodulating process does not succeed, the CPU 1 advances the processing to step S135 to finish this subroutine. If the demodulating process succeeds, the CPU 1 advances the processing to step S111. In step S111, the CPU 1 checks whether the distortion quantity of the character is large or not. Then, if the distortion quantity of the character is small, the CPU 1 advances the processing directly to step S113. Whereas, if the distortion quantity of the character is large, the CPU 1 sets the "distorted state flag" in step S112, and advances the processing to step S113. In step S113, the CPU 1 checks whether there are completed the demodulating processes corresponding to the number of all the characters of which lengths are determined to be in the vicinity of the fixed value in the character length checking in steps S103 and S105. Then, if the demodulating processes for all the characters are not yet completed, the CPU 1 returns the processing to step S109 to execute the demodulating process for the next adjacent character. In contrast with this, if the demodulating processes for all the characters are completed, the CPU 1 advances the processing to step S114.

In step S114, the CPU 1 checked whether the number of the characters that have been demodulated by the demodulating process in step S109 is 6 or not. Then, if the number of character is less than 6, there is nothing but such a possibility that the bar width data set to be processed is obtained by the "divided reading", and hence the CPU 1 advances the processing to step S135 to finish this subroutine. Contrastingly, if the number of characters that has been demodulated is 6, the CPU 1 advances the processing to step S115.

In step S115, the CPU 1 checked the length of the sixth character again. Subsequently, if the length of the sixth character is not in the vicinity of the fixed value (S116), the CPU 1 advances the processing to step S135. Contrastingly, if the length of the sixth character is in the vicinity of the fixed value (S116), the CPU 1 checks the center bar in step S117. This check of the center bar is a process of checking whether the character next adjacent to the sixth character coincides with a predetermined pattern set as the center bar. Then, when a desirable result of the center bar checking is obtained (S118), the CPU 1 advances the processing to step S119. Contrastingly, when no desirable result of the center bar checking is obtained (S118), the CPU 1 determines that the bar width data set to be processed is a bar width data set obtained by the "divided reading", and advances the processing to step S135 to finish this subroutine.

In step S119, the CPU 1 checks a length of a seventh character (next to the center bar on the side toward the end guard bar). Then, if the length of the seventh character is not in the vicinity of a fixed value (S120), the bar width data set to be processed is determined not to be the bar width data set obtained by the "continuous reading", and hence the CPU 1 advances the processing to step S135 to finish this subroutine. Whereas, if the length of the seventh character is in the vicinity of the fixed value (S120), the CPU 1 advances the processing to step S121.

In the step S121, the CPU 1 checks a length of the next character (which is an eighth character next to the seventh character in the initial status). Then, if the length of the eighth character is not in the vicinity of a fixed value (S122), the bar width data set to be processed is determined not to be the bar width data set obtained by the "continuous reading", and hence the CPU 1 advances the processing to step S135 to finish this subroutine. Whereas, if the length of the eighth character is in the vicinity of the fixed value (S122), the CPU 1 checks whether the distortion quantity of the character is large or not in step S123. Subsequently, if the distortion quantity of the character is small, the CPU 1 advances the processing directly to step S125. If the distortion quantity of the character is large, the CPU 1 advances the processing to step S125 after setting the "distorted state flag" in step S124. In step S125, the CPU 1 checks whether the checking of lengths of characters are finished up to a twelfth character (adjacent to the end guard bar on the side of the center bar). Then, if the checks of the lengths of the characters up to the twelfth character are finished, the CPU 1 advances the processing to step S126 to demodulate six pieces of characters constituting a second block. Whereas, if the checks of the lengths of the characters are not yet finished up to the twelfth character, the CPU 1 returns the processing to step S121 to check a length of the next character adjacent thereto.

In step 126, the CPU 1 fetches the character closest to the center bar among the characters of which lengths are determined to be in the vicinity of the fixed value in steps S120 and S122, and executes the demodulating process for the fetched character similarly to S109. In next step S127, the CPU 1 checked whether the demodulating process in step S126 succeeds or not. Then, if the demodulating process does not succeed, the CPU 1 advances the processing to step S135 to finish this subroutine. If the demodulating process succeeds, the CPU 1 advances the processing to step S128. In step S128, the CPU 1 checks whether the distortion quantity of the character is large or not. Then, if the distortion quantity of the character is small, the processing advances directly to step S130. Whereas, if the distortion quantity of the character is large, the CPU 1 sets the "distorted state flag" in step S129 and advances the processing to step S130. In step S130, the CPU 1 checks whether there are completed the demodulating processes corresponding to the number of the characters of which lengths are determined to be in the vicinity of the fixed value in the character length checking or not in steps S120 and S122. Then, if the demodulating processes for all the characters are not yet completed, the CPU 1 returns the processing to step S126 to execute the demodulating process for the next adjacent character. In contrast with this, if the demodulating processes for all the characters are completed, the CPU 1 advances the processing to step S131.

In step S131, the CPU 1 checks the length of the twelfth character again. Subsequently, if the length of the twelfth character is not in the vicinity of the fixed value (S132), the CPU 1 advances the processing to step S135. If the length of the twelfth character is in the vicinity of the fixed value (S132), the CPU 1 checks the end guard bar in step S133. This check of the end guard bar is a process of checking whether the character next adjacent to the twelfth character coincides with a predetermined pattern set as the end guard bar. Then, when a desirable result of the end guard bar checking is obtained (S134), the CPU 1 determines that the bar width data set to be processed is the bar width data set obtained by the "continuous reading", and therefore advances processing to step S135. Contrastingly, when no desirable result of the end guard bar checking is obtained (S134), the CPU 1 determines that the bar width data set to be processed is the bar width data set obtained at least by the "block reading", and therefore advances the processing to step S135 to finish this subroutine.

In step S135, the CPU 1 checks whether the data completely demodulated in steps S109 and S126 include the start guard bar and three or more characters or not. Then, if the completely demodulated data include the start guard bar and the three or more characters, the bar width data set to be processed can be determined to be the bar width data set obtained by at least the "divided reading", and hence the CPU 1 sets a "completion-of-demodulation flag" in step S137 and thus terminates this subroutine. Contrastingly, if the same data do not include the start guard bar and the three or more characters, a reliability on the data is comparatively low, and hence the CPU 1 resets the "completion-of-demodulation flag" in step S136, and terminates this subroutine.

On the other hand, when it is judged that the bar width data set does not include the start guard bar in step S001, there is no such possibility that the bar width data set to be processed is obtained by the "continuous reading", and hence the CPU 1 advances the processing to step S138. In step S138, the CPU 1 checks whether the bar width data set to be processed passes through the center bar. Then, if the center bar is included therein, the CPU 1 advances the processing to step S139. Steps S139 through S169 involves processes for demodulating the characters as far as possible to be demodulated in bilateral directions with the center bar as the center point.

In step S139, the CPU 1 checks the lengths of the sixth and seventh characters. Then, if both of the lengths of the sixth and seventh characters are not in the vicinity of the fixed value (S140), the CPU 1 conceives that the bar width data set to be processed is a data set based on a pattern other than the bar code. In this case, the CPU 1 resets the "completion-of-demodulation flag" in step S136, and terminates this subroutine. In contrast with this, if any one of the lengths of the sixth and seventh characters is in the vicinity of the fixed value (S140), the CPU 1 advances the processing to step S141.

In step S141, the CPU 1 checked a length of the adjacent character (which is the seventh character in the initial status) on the side toward the end guard bar. Subsequently, if the length of the same adjacent character is not in the vicinity of the fixed value (S142), the CPU 1 advances the processing to step S146 to demodulate the characters in the second data block of which length has hitherto been determined to be in the vicinity of the fixed value. Contrastingly, if the length of this character is in the vicinity of the fixed value (S142), the CPU 1 checks whether the distortion quantity of the character is large or not in step S143. Then, if the distortion quantity of the character is small, the CPU 1 advances the processing directly to step S145. Whereas, if the distortion quantity of the character is large, the CPU 1 sets the "distorted state flag" in step S144, and thereafter advances the processing to step S145. In step S145, the CPU checked whether the checking of the lengths of the six characters forming the second data block is finished. Then, if the checks of the lengths of the six characters are finished, the CPU 1 advances the processing to step S146 to demodulate those six characters. Whereas, if the checks of the lengths of the six characters are not yet finished, the CPU 1 returns the processing to step S141 to check a length of the next adjacent character.

In step S146, the CPU 1 fetches the character closest to the center bar among the characters of which lengths are determined to be in the vicinity of the fixed value in steps S142, and executes the demodulating process for the fetched character similarly to step S109. In next step S147, the CPU 1 checks whether the demodulating process in step S146 succeeds or not. Then, if the demodulating process does not succeed, the CPU 1 advances the processing directly to step S151. If the demodulating process succeeds, the CPU 1 advances the processing to step S148. In step S148, the CPU 1 checks whether the distortion quantity of the character is large. Then, if the distortion quantity of the character is small, the CPU 1 advances the processing directly to step S150. Whereas, if the distortion quantity of the character is large, the CPU 1 sets the "distorted state flag" in step S149, and advances the processing to step S150. In step S150, the CPU 1 checks whether there are completed the demodulating processes corresponding to the number of all characters of which lengths are determined to be in the vicinity of the fixed value in the character length checking in step S142. Then, if the demodulating processes for all the characters are not yet completed, the CPU 1 returns the processing to step S146 to execute the demodulating process for the next adjacent character. In contrast with this, if the demodulating processes for all the characters are completed, the CPU 1 advances the processing to step S151.

In step S151, the CPU checks whether the number of the characters that have been demodulated by the demodulating process in step S146 is 6. Then, if the number of the character is less than 6, the CPU 1 advances the processing to step S154 to demodulate the characters included in the first data block. Contrastingly, if the number of the characters that have been demodulated is 6, the CPU 1 advances the processing to step S152.

In step S152, the CPU 1 checks the length of the twelfth character again, and checks the end guard bar. Subsequently, in any case (S153), the CPU 1 advances the processing to step S154 to demodulate the characters included in the first data block.

In step S154, the CPU 1 checks a length of the adjacent character (which is the sixth character in the initial status) on the side toward the start guard bar. Then, if the length of this adjacent character is not in the vicinity of the fixed value (S155), the CPU 1 advances the processing to step S159 to demodulate the characters in the first data block of which length has hitherto been determined to be in the vicinity of the fixed value. Contrastingly, if the length of the same character is in the vicinity of the fixed value (S155), the CPU 1 checks whether the distortion quantity is large or not in step S156. Then, if the distortion quantity of the character is small, the CPU 1 advances the processing directly to step S158. Whereas, if the distortion quantity of the character is large, the CPU 1 sets the "distorted state flag" in step S157, and thereafter advances the processing to step S158. In step S158, the CPU 1 checks whether the checking of the lengths of the six characters forming the first data block is finished. Then, if the checks of the lengths of the six characters are finished, the CPU 1 advances the processing to step S159 to demodulate those six characters. Whereas, if the checks of the lengths of the six characters are not yet finished, the CPU 1 returns the processing to step S154 to check a length of the next adjacent character.

In step S159, the CPU 1 fetches the character closest to the center bar among the characters of which lengths are determined to be in the vicinity of the fixed value in steps S155, and executes the demodulating process for the fetched character. In next step S160, the CPU 1 checks whether the demodulating process in step S159 succeeds or not. Then, if the demodulating process does not succeed, the CPU 1 advances the processing directly to step S164. If the demodulating process succeeds, the CPU 1 advances the processing to step S161. In step S161, the CPU 1 checks whether the distortion quantity of the character is large or not. Then, if the distortion quantity of the character is small, the CPU 1 advances the processing directly to step S163. Whereas if the distortion quantity is large, the CPU 1 sets the "distorted state flag" in step S162, and thereafter advances the processing to step S163. In step S163, the CPU 1 checks whether there are completed the demodulating processes corresponding to the number of all characters of which lengths are determined to be in the vicinity of the fixed value in the character length checking in step S155. Then, if the demodulating processes for all the characters are not yet completed, the CPU 1 returns the processing to step S159 to execute the demodulating process for the next character. In contrast with this, if the demodulating processes for all the characters are completed, the CPU 1 advances the processing to step S164.

In step S164, the CPU 1 checks whether the number of the characters that have been demodulated by the demodulating process in step S159 is 6. Then, if the number of the characters is 6, the CPU 1 advances the processing to step S169. If less than 6 characters, the CPU 1 advances the processing to step S165.

In step S165, the CPU 1 checks the length of the first character. If the length of the first character is not in the vicinity of the fixed value (which passes through a case where the first character is lost) (S166), the CPU 1 advances the processing to step S169. Whereas, if the length of the first character is in the vicinity of the fixed value (S166), the CPU 1 the start guard bar checks in step S167. Then, if the start guard bar is detected (S168), the CPU 1 determines that this is contradictory to the determination made in step S101, and hence resets the "completion-of-demodulation flag" in step S136, thus finishing this subroutine. Whereas, if the start guard bar is not detected (S168), the CPU 1 advances the processing to step S169.

In step S169, the CPU 1 checks whether the completely demodulated data set has such a construction that characters are continuously linked to both sides of the center bar. Then, if the data set has the construction, the CPU 1 sets the "completion-of-demodulation flag" in step S137, and terminates this subroutine. Contrastingly, if the data set does not have the above-described construction, this implies a situation that might hardly happen, and the reliability of the data set is low. Therefore, the CPU 1 resets the "completion-of-demodulation flag" in step S136, and terminates this subroutine.

On the other hand, when it is judged that the bar width data set does not include the center bar in step S138, the bar width data set to be processed is not obtained by the "block reading", the CPU 1 advances the processing to step S170. In step S170, the CPU 1 checks whether the bar width data set to be processed passes through the end guard bar. Then, if the end guard bar is included therein, the data width data set is conceived as based on a pattern other than the bar code. In this case, the CPU 1 resets the "completion-of-demodulation flag" in step S136, and terminates this subroutine. In contrast with this, if the bar width data set passes through the end guard bar, the CPU 1 advances the processing to step S171. Steps S171 through S187 involve processes for demodulating the characters as far as possible to be demodulated in direction toward the center bar with the end guard bar as the starting point.

In step S171, the CPU 1 checks the length of the twelfth character. Subsequently, if the length of the twelfth character is not in the vicinity of the fixed value (S172), the bar width data set is conceived as a data set based on a pattern other than of the bar code. In this case, the CPU 1 resets the "completion-of-demodulation flag" in step S136, and terminates this subroutine. In contrast with this, if the length of the twelfth character is in the vicinity of the fixed value (S172), the CPU 1 advances the processing to step S173.

In step S173, the CPU 1 checks a length of the adjacent character (which is the eleventh character in the initial status) on the side toward the center bar. Subsequently, if the length of the same adjacent character is not in the vicinity of the fixed value (S174), the CPU 1 advances the processing to step S178 to demodulate the characters in the second data block of which length has hitherto been determined to be in the vicinity of the fixed value. Contrastingly, if the length of this character is in the vicinity of the fixed value (S174), the CPU 1 checks whether the distortion quantity of the character is large or not in step S175. Then, if the distortion quantity of the character is small, the CPU 1 advances the processing directly to step S177. Whereas, if the distortion quantity of the character is large, the CPU 1 sets the "distorted state flag" in step S176, and thereafter advances the processing to step S177. In step S177, the CPU 1 checks whether the checking of the lengths of the six characters forming the second data block is finished. Then, if the checks of the lengths of the six characters are finished, the CPU 1 advances the processing to step S178 to demodulate those six characters. Whereas, if the checks of the lengths of the six characters are not yet finished, the CPU 1 returns the processing to step S173 to check a length of the next adjacent character.

In step S178, the CPU 1 fetches the character closest to the end guard bar among the characters of which lengths are determined to be in the vicinity of the fixed value in steps S172 or S174, and executes the demodulating process for the fetched character. In next step S179, the CPU 1 checks whether the demodulating process in step S178 succeeds or not. Then, if the demodulating process does not succeed, the CPU 1 advances the processing directly to step S183. If the demodulating process succeeds, the CPU 1 advances the processing to step S180. In step S180, the CPU 1 checks whether the distortion quantity of the character is large or not. Then, if the distortion quantity of the character is small, the CPU 1 advances the processing directly to step S182. Whereas, if the distortion quantity of the character is large, the CPU 1 sets the "distorted state flag" in step S181, and advances the processing to step S182. In step S182, the CPU 1 checks whether there are completed the demodulating processes corresponding to the number of all characters of which lengths are determined to be in the vicinity of the fixed value in the character length checking in step S172 or S174. Then, if the demodulating processes for all the characters are not yet completed, the CPU 1 returns the processing step S178 to execute the demodulating process for the next adjacent character. In contrast with this, if the demodulating processes for all the characters are completed, the CPU 1 advances the processing to step S183.

In step S183, the CPU 1 checks the length of the seventh character. Then, if the length of the seventh character is not in the vicinity of the fixed value (which passes through a case where the seventh character is lost) (S184), the CPU 1 advances the processing to step S187. Whereas, if the length of the seventh character is in the vicinity of the fixed value (S184), the CPU 1 checks the center bar and the length of the sixth character in step S185. Then, if the center bar is detected, or if the length of the sixth character is in the vicinity of the fixed value (S186), the CPU 1 determines that this is contradictory to the determination made in step S138. Hence, the CPU 1 sets the "completion-of-demodulation flag" in step S136, and terminates this subroutine. Whereas, if the center bar is not detected (S186), the CPU 1 advances the processing to step S187.

In step S187, the CPU 1 checks whether the data completely demodulated in step S178 include the end guard bar and three or more characters. Then, if the completely demodulated data include the end guard bar and the three or more characters, the bar width data set to be processed can be determined to be the bar width data set obtained by at least the "divided reading", hence the CPU 1 sets the "completion-of-demodulation flag" in step S137, and terminates this subroutine. Contrastingly, if the same data do not include the end guard bar and the three or more characters, the reliability on the data is comparatively low, hence the CPU 1 resets the "completion-of-demodulation flag" in step S136, and terminates this subroutine.

After finishing the data demodulating process, the CPU 1 returns the processing to the main routine in FIG. 2, and checks in step S003 whether or not the "completion-of-demodulation flag" is set. This "completion-of-demodulation flag" indicates that the bar width data set has been well demodulated by the data demodulating process in step S002. If this "completion-of-demodulation flag" is not set, the CPU 1 discards of the bar width data set to be processed at this time, and returns the processing to step S001 in order to execute the demodulating process with respect to the bar width data set newly fetched out of the bar width data set storage buffer 2.

Whereas if the "completion-of-demodulation flag" is set, the CPU 1 checks in step S004 whether or not the demodulated data obtained by the data demodulating process in step S002 contain the region corresponding to the whole left data block (contain the start guard bar and the center bar). Then, if the demodulated data contain the region corresponding to the whole left data block, the CPU 1 advances the processing to step S005.

In step S005, the CPU 1 checks whether the demodulated data obtained by the data demodulating process in step S002 correspond to the upper stage bar code or the lower stage bar code. Then, the CPU 1, when judging that the demodulated data correspond to the upper stage bar code, advances the processing to step S006.

In step S006, the CPU 1 stores the Ig-up buffer 6b (the first buffer) with the demodulated data obtained by the data demodulating process in step S002.

In next step S007, the CPU 1 synthesizes the demodulated data stored in the Ig-up buffer 6b with the demodulated data stored in the right data block temporary saving buffer 6a on the basis of the center bar (CB) (which corresponds to a first synthesizing unit). Note that the respective sets of demodulated data to be synthesized must be overlapped (coincident) with each other by two or more characters in order to effect this synthesis.

In next step S008, the CPU 1 executes the above modulus 10 check with respect to the demodulated data synthesized in step S007 (after calculating the flag characters), and thus judges whether or not the demodulated data corresponding to the whole upper stage bar code are obtained. Then, if a good result of the modulus 10 check is acquired (if the demodulated data corresponding to the whole upper stage bar code are obtained), the CPU 1 stores the M10-buff-up buffer 6d with the thus synthesized demodulated data in step S009, and thereafter advances the processing to step S023. Whereas if the good result of the modulus 10 check is not obtained (if the demodulated data corresponding to the whole upper stage bar code are not obtained), the CPU 1 advances the processing directly to step S023.

On the other hand, the CPU 1, when judging in step S005 that the demodulated data obtained by the demodulating process in step S002 correspond to the lower stage bar code, stores the Ig-down buffer 6c (the second buffer) with the demodulated data obtained by the data demodulating process in step S002.

In next step S011, the CPU 1 synthesizes the demodulated data stored in the Ig-down buffer 6c with the demodulated data stored in the right data block temporary saving buffer 6a on the basis of the center bar (CB) (which corresponds to a second synthesizing unit). Note that the respective sets of demodulated data to be synthesized must be overlapped (coincident) with each other by two or more characters in order to effect this synthesis.

In next step S012, the CPU 1 executes the above modulus 10 check with respect to the demodulated data synthesized in step S011 (after calculating the flag characters), and thus judges whether or not the demodulated data corresponding to the whole lower stage bar code are obtained. Then, if a good result of the modulus 10 check is acquired (if the demodulated data corresponding to the whole lower stage bar code are obtained), the CPU 1 stores the M10-buff-down buffer 6e with the thus synthesized demodulated data in step S013, and thereafter advances the processing to step S023. Whereas if the good result of the modulus 10 check is not obtained (if the demodulated data corresponding to the whole lower stage bar code are not obtained), the CPU 1 advances the processing directly to step S023.

On the other hand, the CPU 1, when judging in step S004 that the demodulated data obtained by the demodulating process in step S002 do not include the demodulated data corresponding to the whole left data block, stores the right data block temporary saving buffer 6a (a third buffer) with this demodulated data in step S014.

Processes in subsequent steps S015–S018 are processes of trying to synthesize the demodulated data stored in the right data block temporary saving buffer 6a with the demodulated data stored in the Ig-up buffer 6b. Processes in steps S019–S022 are processes of trying to synthesize the demodulated data stored in the right data block temporary saving buffer 6a with the demodulated data stored in the Ig-down buffer 6c. As described above, the reason for the sequential trials of synthesizing the demodulated data stored in the right data block temporary saving buffer 6a with the demodulated data in the left data blocks of the upper and lower stages, is that the demodulated data in the right data block do not contain identification information for distinguishing between the upper stage and the lower stage.

In step S015, the CPU 1 checks whether or not the demodulated data are stored in the M10-buff-up buffer 6d. Then, if the M10-buff-up buffer 6d is stored with the demodulated data, the CPU 1 advances the processing directly to step S019.

Whereas if the M10-buff-up buffer 6d is stored with no demodulated data, the CPU 1 synthesizes in step S016 the demodulated data stored in the right data block temporary saving buffer 6a with the demodulated data stored in the M10-buff-up buffer 6d on the basis of the center bar (CB) (which corresponds to the first synthesizing unit). Note that the respective sets of demodulated data to be synthesized must be overlapped (coincident) with each other by two or more characters in order to effect this synthesis.

In next step S017, the CPU 1 executes the above modulus 10 check with respect to the demodulated data synthesized in step S016 (after calculating the flag characters), and thus judges whether or not the demodulated data corresponding to the whole upper stage bar code are obtained. Then, if a good result of the modulus 10 check is acquired (if the demodulated data corresponding to the whole upper stage bar code are obtained), the CPU 1 stores in step S018 the M10-buff-up buffer 6d with the demodulated data synthesized in step S016, and thereafter advances the processing to step S019. Whereas if the good result of the modulus 10 check is not obtained (if the demodulated data corresponding to the whole upper stage bar code are not obtained), the CPU 1 advances the processing directly to step S019.

In step S019, the CPU 1 checks whether or not the demodulated data are stored in the M10-buff-down buffer 6e. Then, if the M10-buff-down buffer 6e is stored with the demodulated data, the CPU 1 advances the processing directly to step S023.

Whereas if the M10-buff-down buffer 6e is stored with no demodulated data, the CPU 1 synthesizes in step S020 the demodulated data stored in the right data block temporary saving buffer 6a with the demodulated data stored in the M10-buff-down buffer 6e on the basis of the center bar (CB) (which corresponds to the second synthesizing unit). Note that the respective sets of demodulated data to be synthesized must be overlapped (coincident) with each other by two or more characters in order to effect this synthesis.

In next step S021, the CPU 1 executes the above modulus 10 check with respect to the demodulated data synthesized in step S020 (after calculating the flag characters), and thus judges whether or not the demodulated data corresponding to the whole lower stage bar code are obtained. Then, if a good result of the modulus 10 check is acquired (if the demodulated data corresponding to the whole lower stage bar code are obtained), the CPU 1 stores in step S022 the M10-buff-down buffer 6e with the demodulated data synthesized in step S020, and thereafter makes the processing proceed to step S023. Whereas if the good result of the modulus 10 check is not obtained (if the demodulated data corresponding to the whole lower stage bar code are not obtained), the CPU 1 advances the processing directly to step S023.

In step S023, the CPU 1 checks whether or not both of the M10-buff-up buffer 6d and the M10-buff-down buffer 6e are stored with the demodulated data. Then, if neither the M10-buff-up buffer 6d nor the M10-buff-down buffer 6e is stored with the demodulated data, the CPU 1 judges that there are not yet prepared the demodulated data (modulus 10-ok data) showing the good result of the modulus 10 check, and returns the processing to step S001. Whereas if both of the M10-buff-up buffer 6d and the M10-buff-down buffer 6e are stored with the demodulated data, the CPU 1 judges that the there are already prepared the modulus 10-ok data, and advances the processing to step S024.

In step S024, the CPU 1 checks recognition flags of the demodulated data stored in the M10-buff-up buffer 6d and of the demodulated data stored in the M10-buff-down buffer 6e. Then, if the recognition flag of the demodulated data stored in the M10-buff-up buffer 6d is not coincident with a predetermined value "21" indicating the upper stage, or if the recognition flag of the demodulated data stored in the M10-buff-down buffer 6e is not coincident with a predetermined value "29" indicating the lower stage, the CPU 1 advances the processing to S040 from step S025 in order to execute a judgement NG process. Whereas if the recognition flag of the demodulated data stored in the M10-buff-up buffer 6d is coincident with the predetermined value "21" indicating the upper stage, or if the recognition flag of the demodulated data stored in the M10-buff-down buffer 6e is coincident with the predetermined value "29" as the one indicating the lower stage, the CPU 1 advances the processing to S026 from step S025.

In step S026, the CPU 1 checks whether or not both of the demodulated data stored in the M10-buff-up buffer 6d and the demodulated data stored in the M10-buff-down buffer 6e are the demodulated data based on a continuous reading process. This check is executed based on whether or not the demodulated data stored in the M10-buff-up buffer 6d are identical with the demodulated data stored in the Ig-up buffer 6b as well as on whether or not the demodulated data stored in the M10-buff-down buffer 6e are identical with the demodulated data stored in the Ig-down buffer 6c. Then, if both of the demodulated data stored in the M10-buff-up buffer 6d and the demodulated data stored in the M10-buff-down buffer 6e are based on the continuous reading process, the CPU 1 advances the processing to step S039 in order to execute a judgement OK process. By contrast, if one demodulated data set thereof is not based on the continuous reading process, the CPU 1 advances the processing to step S027.

In step S027, the CPU 1 checks whether or not both of the demodulated data stored in the M10-buff-up buffer 6d and the demodulated data stored in the M10-buff-down buffer 6e are based on a block reading process. Then, if the demodulated data stored in the M10-buff-up buffer 6d or the demodulated data stored in the M10-buff-down buffer 6e are not based on the block reading process (i.e., if identical with the demodulated data based on a division reading process), the CPU 1 advances the processing to step S040 to execute a judgement NG process. Whereas if both of these two sets of demodulated data are based on the block reading process, the CPU 1 advances the processing to step S028.

In step S028, the CPU 1 compares the right data block of the demodulated data stored in the M10-buff-up buffer 6d with the right data block of the demodulated data stored in the Ig-up buffer 6b.

In next step S029, the CPU 1, on the basis of a result of the comparison in step S028, calculates the number of the same characters in the right data blocks of both of demodulated data. This number of characters corresponds to the number of numerical data corresponding to the right data block contained in the demodulated data stored in the Ig-up buffer 6b. Then, the CPU 1 substitutes the calculated number into a variable "count-up".

In step S030, the CPU 1 compares the right data block of the demodulated data stored in the M10-buff-down buffer 6e with the right data block of the demodulated data stored in the Ig-down buffer 6c.

In next step S031, the CPU 1, on the basis of a result of the comparison in step S030, calculates the number of the same characters in the right data blocks of both of demodulated data. This number of characters corresponds to the number of numerical data corresponding to the right data block contained in the demodulated data stored in the Ig-down buffer 6c. Then, the CPU 1 substitutes the calculated number into a variable "count-down".

In next step S032, the CPU 1 checks whether or not both of the variable "count-up" and the variable "count-down" are over "2". Then, if one of these variables is less than "2", it is assumed that there is no such assurance that the demodulated data corresponding to the whole bar code of each stage can be precisely reproduced, and therefore the processing proceeds to step S040. Whereas if the two variables are over "2", the CPU 1 advances the processing to step S033.

In step S033, the CPU 1 sets a pointer (a) as "6", which points addresses in the Ig-up buffer 6b and the Ig-down buffer 6c.

Subsequently, the CPU 1 enters a loop of processes in step S034 to S038. This loop of processes are processes for confirming that the demodulated data stored in the Ig-up buffer 6b are different from the demodulated data stored in the Ig-down buffer 6c in the right data block.

In first step S034 after entering this loop process, the CPU 1 checks whether or not the variable "count-up" or the variable "count-down" reaches "0".

In next step S035, the CPU 1 compares the numerical data stored in an entry of an address "a" in the Ig-up buffer 6b with the numerical data stored in an entry in an address "a" of the M10-buff-down buffer 6e.

In next step S036, the CPU 1 checks whether or not the two sets of numerical data are coincident with each other on the basis of a result of the comparison in step S035. Then, if the two sets of numerical data are coincident with each other, the CPU 1 increments the pointer (a) by "1" in step S037.

The CPU 1, after decrementing the variable "count-up" and the variable "count-down" in next step S037, returns the processing to step S034.

As a consequence of repeating the above loop process, the CPU 1, when judging that the variable "count-up" or the variable "count-down" reaches "0" before judging in step S036 that the numerical data are different from each other, advances the processing to step S040. Namely, when both of the upper and lower stages are synthesized based on only the demodulated data obtained by reading one right data block of one of the upper and lower stages, the CPU 1 is incapable of recognizing this fact. Similarly, if the two bar codes are different beyond a range of the demodulated data stored in the Ig-up buffer 6b or in the Ig-down buffer 6c, and even if the demodulated data stored in the Ig-up buffer 6b are synthesized with the demodulated data corresponding to the right data block of the lower stage bar code, and further even if the demodulated data stored in the Ig-down buffer 6c are synthesized with the demodulated data corresponding to the left data block of the upper stage bar code, the CPU 1 is unable to recognize this fact. Thus, when the variable "count-up" or the variable "count-down" is "0", there is no assurance in which the demodulated data corresponding to the upper and lower bar codes can be accurately reproduced, and hence the CPU 1 advances the processing to step S040 to execute the judgement NG process.

By contrast, when judging in step S036 that the numerical data stored in the entry of the address "a" in the Ig-up buffer 6b is different from the numerical data stored in the entry of the address "a" in the M10-buff-down buffer 6e, the CPU 1 advances the processing to step S039 to execute the judgement OK process.

In the judgement OK process executed in step S039, the CPU 1 outputs a voice indicating a completion of reading the bar code (demodulation) out of a loud speaker 10, and reproduces the demodulated data corresponding to the whole two column bar code 21 by combining the demodulated data corresponding to the upper bar code that are stored in the M10-buff-up buffer 6d with the demodulated data corresponding to the lower stage bar code that are stored in the M10-buff-down buffer 6e. The CPU 1 displays information such as a sales price of the commercial goods 20 corresponding to the thus reproduced demodulated data with a light emitting diode 11. Further, the CPU 1 clears all the contents of the respective buffers 6a–6e developed in the RAM 6 in preparation for the next bar code reading process. Upon a completion of the judgement OK process, the CPU 1 returns the processing to step S001.

Further, in the judgement NG process executed in step S040, the CPU 1, after clearing all the contents of the respective buffers 6a–6e developed in the RAM 6, returns the processing step S001.

Operation of Bar Code Reader

Next, the thus constructed bar coder reader in accordance with this embodiment will be explained in terms of its operation with reference to FIG. 9. Now, it is assumed that the respective blocks of the two column bar code 21 is read through a beam scan along trajectories (1)–(4) shown in FIG. 9. In this case, if the seventh and eighth characters C7, C8 of the two bar codes are identical with each other, the demodulated data (stored in the Ig-up buffer 6b) according to the trajectory (1) can be synthesized with the demodulated data (stored in the right data block temporary saving buffer 6a) according to the trajectory (2) as well as with the demodulated data (stored in the right data block temporary saving buffer 6a) according to the trajectory (4). Similarly, the demodulated data (stored in the Ig-down buffer 6c) according to the trajectory (3) can be synthesized with the demodulated data according to the trajectory (2) as well as with the demodulated data according to the trajectory (4). Accordingly, in this case, there is no assurance capable of reproducing the demodulated data corresponding to the whole bar code of each stage, and hence, just when confirming that the eighth characters C8 of the demodulated data stored in the Ig-up buffer 6b and of the demodulated data stored in the Ig-down buffer 6c are identical with each other (just when confirming that the two variables "count-up" and "count-down" become "0" in step S034 after judging in step S035 that the eighth characters C8 are identical with each other), the CPU 1 executes the judgement NG process (S040).

Further, if the seventh characters C7 or the eighth characters C8 of the two bar codes are different from each other, the demodulated data according to the trajectory (1) are synthesized with only the demodulated data according to the trajectory (2), and the demodulated data according to the trajectory (3) are synthesized with only the demodulated data according to the trajectory (4). Accordingly, in this case, there is the assurance capable of reproducing the demodulated data corresponding to the whole bar code of each stage, and hence, just when confirming that the seventh characters C7 of the demodulated data stored in the Ig-up buffer 6b and of the demodulated data stored in the Ig-down buffer 6c are different from each other or just when confirming that the eighth characters C8 are different from each other (just when judging in step S035 that the characters are not identical with each other), the CPU 1 executes the judgement OK process (S039).

Note that if the trajectory (1) discontinues at the center bar (CB), the demodulated data according to the trajectory (1) can be synthesized with the demodulated data according to the trajectory (2) as well as with the demodulated data according to the trajectory (4). Similarly, if the trajectory (3) discontinues at the center bar (CB), the demodulated data according to the trajectory (3) can be synthesized with the demodulated data according to the trajectory (2) as well as with the demodulated data according to the trajectory (4). Accordingly, in this case, there is no assurance capable of reproducing the demodulated data corresponding to the whole bar code of each stage, and hence the CPU 1 immediately executes the judgement NG process (just when confirming in step S032 that initial values of the two variables "count-up" and "count-down" are less than "2") (step S040).

Furthermore, when the trajectory (1) and the trajectory (3) have reached the end guard bar (EGB), both of the demodulated data according to the trajectory (1) and the demodulated data according to the trajectory (3) are the demodulated data according to the continuous reading process, and inevitably there must be a good result of the modulus 10 check. Hence, the CPU 1 immediately executes the judgement OK process without comparing the data between the upper and lower bar codes (steps S026 and S039).

As discussed above, according to the bar code reader in this embodiment, as far as the demodulated data obtained by reading each data block of each stage in the two column bar codes structured by arranging the WPC codes up and down at the two columns, contain the data corresponding to the data characters of the right data block and different from each other, there are validated the demodulated data corresponding to the whole bar codes of the respective stages, which are obtained by synthesizing the demodulated data corresponding to the left data block of each stage with the demodulated data corresponding to the right data block. Accordingly, the block reading of the two column bar codes can be recognized under a fixed restriction for preventing a misreading, and therefore the demodulated data corresponding to the whole two column bar codes can be reproduced with a good response as compared with the prior art bar code reader recognizing only the continuous reading. Namely, as shown in FIG. 13, an angle β of the scan beam capable of the block reading is larger than an angle α of the scan beam capable of the continuous reading, and hence a readable probability becomes higher. It is therefore feasible to reproduce the demodulated data corresponding to the whole two column bar codes for a short period of time.

According to the bar coder reader and the bar code reading method of the present invention which are structured as discussed above, it is possible to accurately synthesize the demodulated data obtained by block-reading the right data block per stage of the two column bar codes with the demodulated data obtained by block-reading the left data block. Hence, the demodulated data corresponding to the whole two column bar codes can be reproduced for the short time.

It is apparent that, in this invention, a wide range of different working modes can be formed based on the invention without deviating from the spirit and scope of the invention. This invention is not restricted by its specific working modes except being limited by the appended claims.

We claim:

1. A bar code reader, comprising:

a bar code pattern detecting unit scanning a two column bar code consisting of a first bar code and a second bar code, each of said bar code containing a first data block and a second data block, each of said data block containing a predetermined number of data characters, and detecting a bar code pattern on a trajectory of the scanning;

a demodulating unit obtaining demodulated data by demodulating the bar code pattern detected by said bar code pattern detecting unit;

a first buffer storing the demodulated data when the demodulated data obtained by said demodulating unit contain a portion corresponding to the first data block of the first bar code;

a second buffer storing the demodulated data when the demodulated data obtained by said demodulating unit contain a portion corresponding to the first data block of the second bar code;

a third buffer storing the demodulated data when the demodulated data obtained by said demodulating unit contain a portion corresponding to the second data block of the first bar code or the second bar code;

a first synthesizing unit synthesizing the demodulated data stored in said first buffer with the demodulated data stored in said third buffer;

a second synthesizing unit synthesizing the demodulated data stored in said second buffer with the demodulated data stored in said third buffer; and a validating unit, when at least both of the demodulated data stored in said first buffer and the demodulated data stored in said second buffer contain a portion corresponding to data characters of the second data block and portions corresponding to the data characters of the second data blocks of the both of demodulated data are different from each other, the demodulated data synthesized by said first synthesizing unit as demodulated data corresponding to the first bar code and validating the demodulated data synthesized by said second synthesizing unit as demodulated data corresponding to the second bar code.

2. A bar code reader according to claim 1, wherein the bar code is a WPC code, a UPC/A code, a JAN code or an EAN code.

3. A bar code reader according to claim 1, wherein said first synthesizing unit synthesizes, only when the demodulated data stored in said first buffer and the demodulated data stored in said third buffer are overlapped with each other by two or more characters, these pieces of demodulated data, and said second synthesizing unit synthesizes, only when the demodulated data stored in said second buffer and the demodulated data stored in said third buffer are overlapped with each other by two or more characters, these pieces of demodulated data.

4. A bar code reader according to claim 1, wherein said validating unit, only when both of the demodulated data stored in said first buffer and the demodulated data stored in said second buffer contain a portion corresponding to two or more data characters of the second data block, validates the demodulated data obtained by said first synthesizing unit as demodulated data corresponding to the first bar code, and validates the demodulated data obtained by said second synthesizing unit as demodulated data corresponding to the second bar code.

5. A bar code reader according to claim 1, wherein said validating unit, when the demodulated data stored in said first buffer correspond to the first bar code and the demodulated data stored in said second buffer correspond to the second bar code, validates the demodulated data stored in said first buffer as demodulated data corresponding to the first bar code, and validates the demodulated data stored in said second buffer as demodulated data corresponding to the second bar code.

6. A bar code reading method, comprising:

a step of scanning a two column bar code containing a first bar code and a second bar code, each of said bar code containing a first data block and a second data block, each of said data block containing a predetermined number of data characters, and detecting a bar code pattern on a trajectory of the scanning;

a step of obtaining demodulated data by demodulating the bar code pattern;

a step of generating demodulated data corresponding to the first bar code by synthesizing demodulated data containing a portion corresponding to the first data block of the first bar code with demodulated data containing a portion corresponding to the second data block of the first bar code or the second bar code;

a step of generating demodulated data corresponding to the second bar code by synthesizing demodulated data containing a portion corresponding to the first data block of the second bar code with demodulated data containing a portion corresponding to the second data block of the first bar code or the second bar code; and a step of validating the demodulated data corresponding to the first bar code and validating the demodulated data corresponding to the second bar code only when both of the demodulated data containing the portion corresponding to the first data block of the first bar code and the demodulated data containing the portion corresponding to the first data block of the second bar code contain a portion corresponding to data characters of the second data block and portions corresponding to the data characters of the second data blocks of both of demodulated data are different from each other.

7. A computer readable medium stored with a program for enabling a computer connected to a detecting device for scanning a two column bar code containing a first bar code and a second bar code, each of said bar code containing a first data block and a second data block, each of said data block containing a predetermined number of data characters, and detecting a bar code pattern on a trajectory of the scanning, to execute:

a step of obtaining demodulated data by demodulating the bar code pattern detected by said detecting device;

a step of generating demodulated data corresponding to the first bar code by synthesizing demodulated data containing a portion corresponding to the first data block of the first bar code with demodulated data containing a portion corresponding to the second data block of the first bar code or the second bar code;

a step of generating demodulated data corresponding to the second bar code by synthesizing demodulated data containing a portion corresponding to the first data block of the second bar code with demodulated data containing a portion corresponding to the second data block of the first bar code or the second bar code; and a step of validating the demodulated data corresponding to the first bar code and validating the demodulated data corresponding to the second bar code only when both of the demodulated data containing the portion corresponding to the first data block of the first bar code and the demodulated data containing the portion corresponding to the first data block of the second bar code contain a portion corresponding to data characters of the second data block and portions corresponding to the data characters of the second data blocks of both of demodulated data are different from each other.

8. A method of reading a two column bar code containing a first bar code and a second bar code, each of said bar code containing a first data block and a second data block, said method, comprising:

a step of obtaining demodulated data by demodulating a bar code pattern in the two column bar code;

a step of validating the demodulated data corresponding to the first bar code and validating the demodulated data corresponding to the second bar code only when both of the demodulated data of the first data block in the first bar code and the demodulated data of the first data block in the second bar coda contain the portion corresponding to the second data block, and portions corresponding to the second data blocks of both of demodulated data are different from each other.

* * * * *